(12) United States Patent
Beattie

(10) Patent No.: US 7,185,556 B2
(45) Date of Patent: Mar. 6, 2007

(54) TIE ROD JAM NUT

(76) Inventor: James C. Beattie, 6747 Whitestone Rd., Baltimore, MD (US) 21207

( * ) Notice: Subject to any disclaimer, the term of this patent is extended or adjusted under 35 U.S.C. 154(b) by 350 days.

(21) Appl. No.: 10/647,304

(22) Filed: Aug. 26, 2003

(65) Prior Publication Data

US 2005/0044985 A1 Mar. 3, 2005

(51) Int. Cl.
| | |
|---|---|
| *G05G 1/00* | (2006.01) |
| *G05G 3/00* | (2006.01) |
| *F16B 2/14* | (2006.01) |
| *F16B 2/18* | (2006.01) |

(52) U.S. Cl. ................ 74/586; 74/579 R; 74/89.37; 403/374.3; 403/33; 403/44; 403/46; 29/516

(58) Field of Classification Search ................ 74/586, 74/579 R, 89.37; 244/99.4; 403/374.3, 403/33, 44, 46; 29/516
See application file for complete search history.

(56) References Cited

U.S. PATENT DOCUMENTS

| | | | | |
|---|---|---|---|---|
| 2,479,096 A | * | 8/1949 | Bratz ........................ 403/46 |
| 2,813,733 A | * | 11/1957 | Herrmann ..................... 403/44 |
| 3,239,930 A | * | 3/1966 | Violleau ...................... 29/516 |
| 3,837,753 A | * | 9/1974 | Weiste et al. ................ 403/33 |
| 4,295,389 A | * | 10/1981 | Geisthoff et al. ............. 74/586 |
| 4,790,201 A | * | 12/1988 | Gheddo ..................... 74/89.37 |
| 5,765,957 A | * | 6/1998 | Connell ....................... 403/46 |
| 6,074,125 A | * | 6/2000 | Krawczak ................ 403/374.3 |
| 6,659,399 B1 | * | 12/2003 | Bagnoli et al. ............ 244/99.4 |

\* cited by examiner

*Primary Examiner*—Vinh T. Luong
(74) *Attorney, Agent, or Firm*—Timothy J. Klima

(57) ABSTRACT

A tie rod jam nut includes a tubular body having an axial bore for receiving a tie rod. A locking portion at a first end of the body can engage the tie rod and a threaded portion of a connecting component attached to the tie rod to lock the connecting component to the tie rod as the locking portion is rotated in one direction and disengage the tie rod to unlock the connecting component when rotated in an opposite direction. An engagement portion is spaced distally from the locking portion toward a second end of the tubular body. The engagement portion can be rotated to remotely rotate the locking portion between the locked and unlocked positions.

28 Claims, 3 Drawing Sheets

TIE ROD JAM NUT

BACKGROUND

In certain machines, tie rods are used to connect two different components together. In an automobile, for instance, a tie rod can be used to connect between a steering box or rack and pinion unit and a wheel steering arm, or between two wheels, among other things. Such tie rods have connectors on one or both ends for connecting to the various components. Such connectors can be in the form of heim joints or tie rod ends that are attached to the tie rod with a threaded connection. In a typical example, the tie rod is tubular and includes an internal threaded bore at one or both ends to receive an externally threaded portion of a connecting component, such as a heim joint or tie rod end. This threaded connection not only connects the connecting component to the tie rod, it also allows the positioning of the connecting component to be adjusted with respect to the tie rod by threading the connecting component in or out of the tie rod, thus altering the effective length of the assembly. As is known, a jam nut threaded onto the threaded portion of the connecting component can be threaded down against the tie rod to lock the two components in the adjusted position. As is also known, this adjusting mechanism can be used in an automobile to adjust toe-in of the wheels, for example.

In a typical example as shown in FIG. 1 (Prior Art), a tie rod assembly 10 has an inboard end 12 and an outboard end 14. The inboard end 12 connects to the steering rack and pinion unit and the out board end 14 connects to the wheel steering arm. The assembly 10 includes a tie rod 16 having axial threaded bores 18 and 20 (see FIG. 2) at the inboard and outboard ends, respectively. An inboard connecting component 22 is threaded into the threaded bore 20 and an outboard connecting component 24 is threaded into the threaded bore 20. An inboard jam nut 26 is threaded onto the inboard connecting component 22 and can be tightened down against the tie rod 16 to lock the connecting component 22 with respect to the tie rod 16, in a known manner. An outboard jam nut 28 is similarly threaded onto the outboard connecting component 24. The inboard connecting component 22 and the outboard connecting component 24 are not threaded the same. Rather, one is threaded with a right hand thread and the other is threaded with a left hand thread. In this manner, the length of the tie rod assembly 10 can be altered to adjust toe-in without disconnecting either connecting component 22, 24 from its respective steering component. All that must be done is to loosen each of the jam nuts 26, 28 and rotate the tie rod 16 in the desired direction. Because of the different handed threads on the two connecting components 22, 24 and respective axial bores 18, 20, rotating the tie rod 16 in one direction will simultaneously thread the two connecting components 22, 24 into the tie rod 16, thus shortening the tie rod assembly 10, and rotating the tie rod 16 in the other direction will simultaneously thread the two connecting components 22, 24 out of the tie rod 16, thus lengthening the tie rod assembly 10. Upon completion of the toe-in adjustment, the two jam nuts 26, 28 are locked onto the tie rod 16 to maintain the adjustment.

In a typical racing car, the steering geometry may be changed several times for one race to find the best combination for the particular track and race conditions. Therefore, it is important that such adjustments can be made quickly and easily. With a tie rod assembly 10 on a typical stock car type race car, the outboard jam nut 28 can be accessed without jacking up the vehicle but the inboard jam nut 26 cannot readily be accessed without jacking up the vehicle. Thus, to adjust toe-in on such a vehicle, the vehicle is typically jacked up to loosen the inboard jam nut 26, the outboard jam nut 28 is loosened, the vehicle is lowered so that the toe-in can be adjusted by rotating the tie rod 16 in the desired direction as described above, the vehicle is jacked up again so that the inboard jam nut 26 can be locked down, the outboard jam nut 28 is locked down and the vehicle is lowered again. This is time consuming and prevents rapid adjustment of the toe-in.

It is an object of this invention to provide a tie rod assembly that does not require a vehicle to be jacked up to adjust toe in.

It is a further object of this invention to provide a tie rod assembly where an inboard jam nut can be loosened and tightened from an outboard position on the vehicle.

It is a further object of this invention to provide a tie rod assembly where the inboard jam nut can be loosened and tightened from a position proximal an outboard jam nut.

It is a further object of this invention to provide an inboard jam nut that can be loosened and tightened from a position proximal an outboard jam nut of a tie rod assembly.

SUMMARY OF THE INVENTION

A tie rod jam nut includes a tubular body having an axial bore for receiving a tie rod. A locking portion at a first end of the body can engage the tie rod and a threaded portion of a connecting component attached to the tie rod to lock the connecting component to the tie rod as the locking portion is rotated in one direction and disengage the tie rod to unlock the connecting component when rotated in an opposite direction. An engagement portion is spaced distally from the locking portion toward a second end of the tubular body. The engagement portion can be rotated to remotely rotate the locking portion between the locked and unlocked positions.

The tie rod jam nut of the present invention allows the quick and easy setting of the toe-in on a vehicle without having to jack up (raise) the vehicle. Since the engagement portion of the jam nut is positioned near the outboard jam nut, access to both is simplified and the entire operation of toe-in adjustment can be performed in a work area spanning a few inches.

The invention will be described in further detail below in conjunction with the attached figures, where like reference numerals indicate like components.

DETAILED DESCRIPTION

Figure 1:
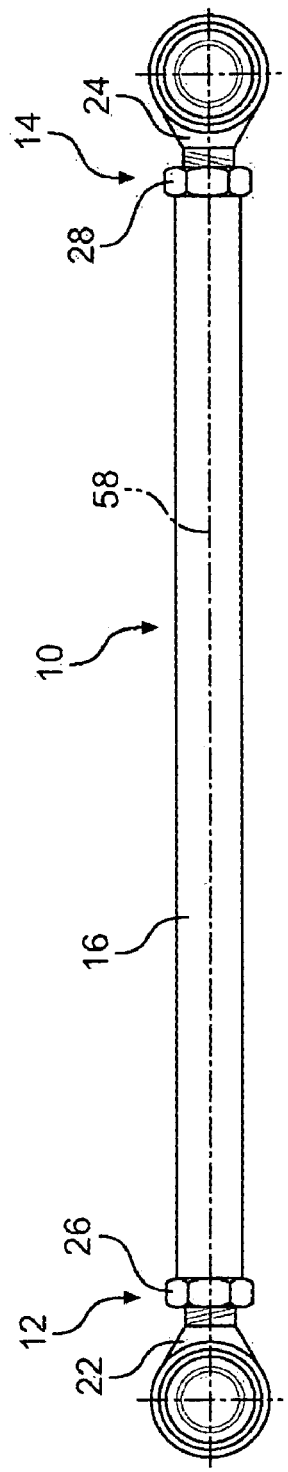
FIG. 1 (Prior Art) shows a side elevational view of a conventional tie rod assembly.
Figure 2:
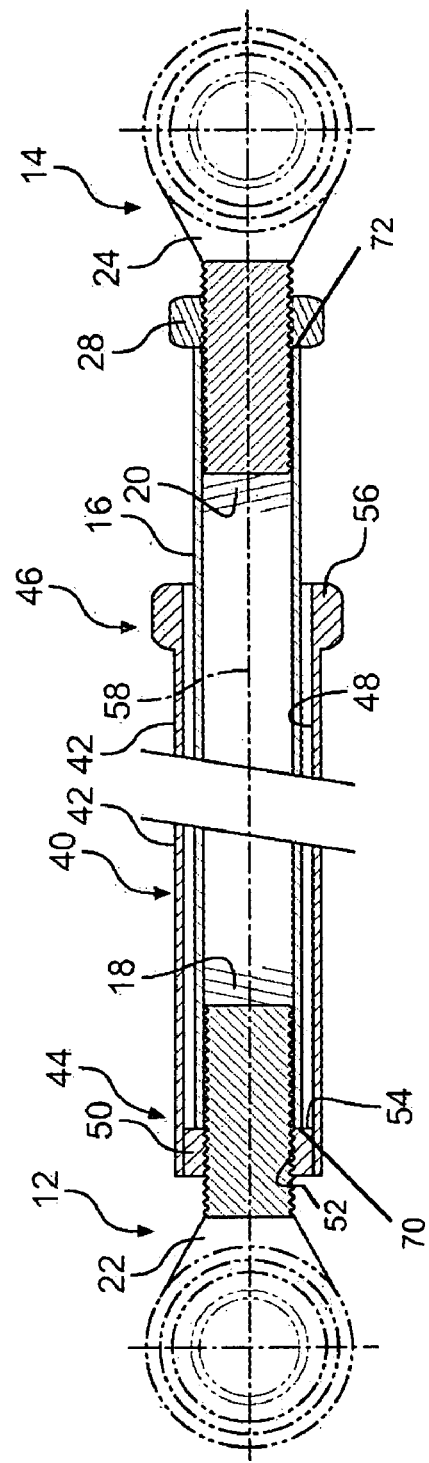
FIG. 2 shows a partial sectional view of the tie rod jam nut of the present invention installed on a conventional tie rod assembly.
Figure 5:
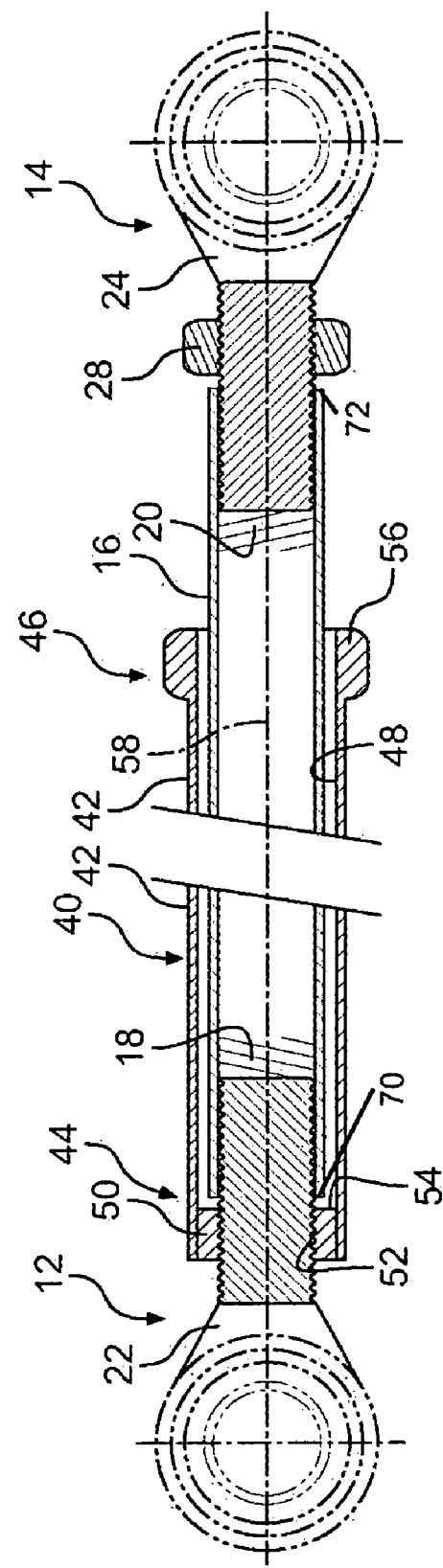
FIG. 5 is a partial sectional view of the tie rod jam nut similar to FIG. 2 but shown in an unlocked position.

A tie rod jam nut 40 according to the present invention is shown in partial sectional view in FIG. 2. It replaces the jam nut 26 shown in FIG. 1 and includes an elongated tubular body 42 having a first end 44 and a second end 46. The tubular body has an axially extending internal bore 48 that receives a portion of the tie rod 16. Tie rod 16 includes an inboard axially facing jam nut engaging portion 70 and an outboard axially facing jam nut engaging portion 72. The tie rod jam nut 40 includes a locking portion 50 connected to the first end of the tubular body 42. The locking portion has a threaded bore 52 for engaging the threaded portion of connecting component 22 and a face portion 54 for engaging the inboard axially facing jam nut engaging portion 70 of the tie rod 16, when the connecting component 22 is screwed into the threaded bore 18 of the tie rod 16. The face portion 54 of the locking portion 50 can thus engage the inboard axially facing jam nut engaging portion 70 of the tie rod 16 so as to lock the connecting component 22 with respect to the tie rod 16 as the locking portion 50 is rotated in a first direction about the threaded portion of the connecting component 22 (see FIG. 2) and disengage the same portion of the tie rod 16 so as to unlock the connecting component 22 with respect to the tie rod 16 as the locking portion 50 is rotated in a direction opposite the first direction about the threaded portion of the connecting component 22 (see FIG. 5). When the tie rod jam nut 40 and jam nut 28 are loosened, i.e., put in the unlocked position (see FIG. 5), the tie rod 16 can be rotated to adjust toe-in and when both jam nuts 40 and 28 are tightened, or put in the locked position, the tie rod 16 is locked with respect to the connecting components 22, 24 and the toe-in remains at the adjusted dimension.

The tie rod jam nut 40 also includes an engagement portion 56 connected to the tubular body 42 and spaced distally from the locking portion 50 toward the second end 46 of the tubular body 42. The engagement portion 46 can be engaged and rotated by the mechanic so as to remotely rotate the locking portion 50 between the locked and unlocked positions. Since the engagement portion 56 is positioned near the outboard jam nut 28, the vehicle does not need to be jacked up to adjust the toe-in. Rather, the tie rod can be unlocked for adjustment of the toe-in by rotating the jam nut 28 and the engagement portion 56 positioned adjacent the jam nut 26. Direct access to the first end of the tie rod 16 is not required since the locking portion 50 can be loosened and tightened from a position near the second end of the tie rod 16.

In a preferred embodiment, the engagement portion 56 is positioned at the second end of the tubular body 42 and the length of the tubular body is set depending on the length of the tie rod to position the engagement portion 56 near the jam nut 28. It is preferred that a small amount of axial spacing is maintained between the engagement portion 56 and the jam nut 28 (i.e., the outermost portion of the second end of the tie rod 16) so that the tie rod 16 can be grasped by hand or by tool and rotated to adjust the toe-in. In preferred embodiments, this positioning of the engagement portion 56 is obtained by spacing the engagement portion 56 away from the locking portion 50 of the tubular body 42 by at least 50% of a length of the tie rod 16, and more preferably by at least 70%. To provide the proper clearance for grasping the tie rod 16, the engagement portion 56 is preferably spaced away from the locking portion 50 by no more than 95% of the length of the tie rod 16. The engagement portion is preferable hexagonally shaped for engagement by a conventional wrench, although other configurations can also be used.

Figure 3:
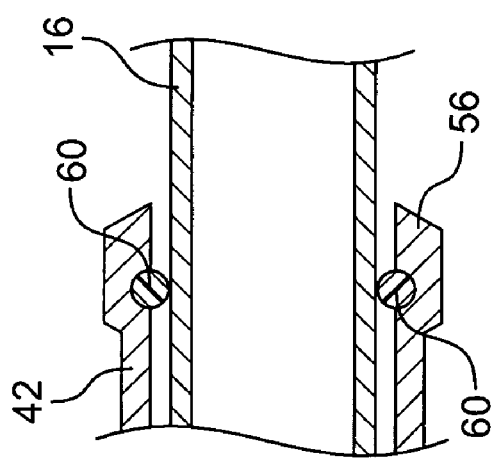
FIG. 3 is a partial sectional view of an alternative embodiment of the tie rod jam nut.

A seal or o-ring 60 can be positioned between the tie rod jam nut 40 and the tie rod 16 near the second end 46 (i.e., the open end) to seal the space between the tie rod jam nut 40 and the tie rod 16 and/or to dampen vibration of the cantilever supported second end 46. See FIG. 3. The fit between such a seal, jam nut 40 and tie rod should not be so tight as to prevent ready rotation between the jam nut 40 and tie rod 16 and interfere with adjustment of the toe-in. For the same reason, the clearance between the axial bore 48 of the jam nut 40 and the tie rod 16 should be sufficient to allow ready rotation with respect to the two components but should not be so large that the outer diameter of the tubular body 42/jam nut 40 is increased so much that interference occur between the exterior of the jam nut 40 and other vehicle components.

The dimensions given above are preferences only and are not intended to limit the scope of the invention. The locking portion, tubular body and engagement portion can be manufactured as a unitary component or can be assembled from separate components attached together by welding, threads or other fastening components. The face portion 54 of the locking portion 50 preferably lies in a plane perpendicular to an axis 58 of the jam nut 40 (and tie rod 16) to engage the end surface of the tie rod 16, although the face portion can also be configured to contact other surfaces of the tie rod 16 for locking purposes. The jam nut is preferable constructed from metal, especially a steel alloy, titanium or aluminum alloy, although other materials can also be used. While the jam nut 40 is described for use with an automotive steering tie rod, it can be used with respect to other components where a remotely actuated locking mechanism is required. The connecting components can be heim joints, tie rod ends, or other form of connectors. Although the above embodiments have been described with respect to more difficult inboard access as compared to the outboard access, the invention can be reversed if the specific application so warrants.

In an alternative embodiment where access to both outer ends of the tie rod assembly is limited, the tie rod jam nut of the present invention can be used on both ends with the two engagement portions positioned at accessible points intermediate the two ends.

Figure 4:
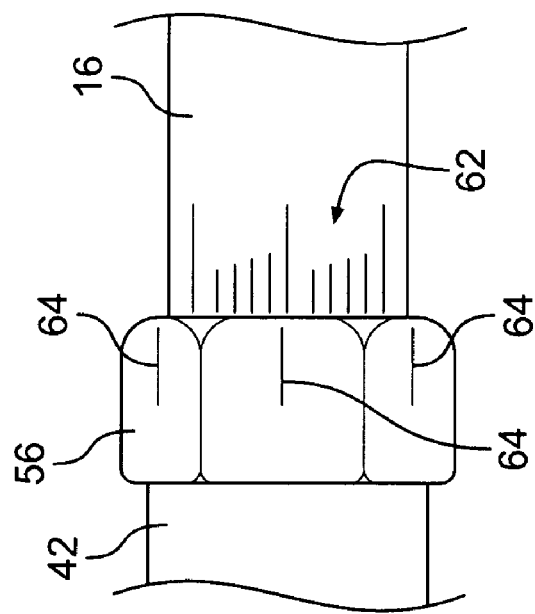
FIG. 4 is a partial side elevational view of a further alternative embodiment of the tie rod jam nut.

A vernier type scale 62 or other graduations can be placed on an exterior surface of the tie rod 16 for comparison with a marking or markings 64 on the jam nut 40 to assist in quickly setting the desired toe-in. See FIG. 4. The scale can be coordinated with the pitch of the threads of bores 18 and 20 for a desired degree of precision in visually adjusting the toe-in.

The various aspects of the different embodiments can be combined in different manners to create new embodiments.

What is claimed is:

1. A tie rod jam nut, comprising:
   an elongated tubular body having a first end and a second end, the body having an axial internal bore constructed and arranged to receive a portion of an elongated tie rod;
   a locking portion connected to the tubular body, the locking portion positioned at the first end of the tubular body and having a threaded bore constructed and arranged to threadingly engage an externally threaded portion of a connecting component threadingly engaged with the tie rod, the locking portion having an axially facing face portion constructed and arranged, upon rotation of the locking portion in a first direction about the threaded portion of the connecting component, to engage an opposed axially facing portion of the tie rod in a manner to create opposed axial forces between the locking portion and the tie rod, and in the externally threaded portion of the connecting component, so as to rotationally and axially lock the connecting component with respect to the tie rod and locking portion and, upon rotation of the locking portion in a direction opposite the first direction about the threaded portion of the connecting component, to disengage the same opposed axially facing portion of the tie rod to release the opposed axial forces between the locking portion and the tie rod, and in the externally threaded portion of the connecting component, so as to rotationally and axially unlock the connecting component with respect to the tie rod and locking portion;

an engagement portion connected to the tubular body and spaced distally from the locking portion toward the second end of the tubular body, the engagement portion constructed and arranged to be engaged and rotated so as to remotely rotate the locking portion between the locked and unlocked positions.

2. The tie rod jam nut as in claim 1, wherein the engagement portion is positioned at the second end of the tubular body.

3. The tie rod jam nut as in claim 1, wherein the engagement portion is positioned proximal a second jam nut of the tie rod when the tie rod jam nut is assembled to the tie rod.

4. The tie rod jam nut as in claim 1, wherein the engagement portion is hexagonally shaped for engagement with a wrench.

5. The tie rod jam nut as in claim 1, wherein the face portion of the locking portion lies in a plane perpendicular to an axis of the elongated tubular body.

6. The tie rod jam nut as in claim 1, wherein the engagement portion is spaced away from the locking portion of the tubular body by at least 50% of a length of the tie rod.

7. The tie rod jam nut as in claim 6, wherein the engagement portion is spaced away from the locking portion of the tubular body by at least 70% of the length of the tie rod.

8. The tie rod jam nut as in claim 7, wherein the engagement portion is spaced away from the locking portion of the tubular body by between 70% and 95% of the length of the tie rod.

9. The tie rod jam nut as in claim 1, wherein the tubular body, the locking portion and the engagement portion are assembled together as a unitary assembly.

10. The tie rod jam nut as in claim 1, wherein the tubular body, the locking portion and the engagement portion are constructed in a unitary manner.

11. The tie rod jam nut as in claim 1 and further comprising the tie rod.

12. The tie rod jam nut as in claim 1, and further comprising markings positioned on an exterior of the tie rod jam nut for comparison to a graduated scale on the tie rod.

13. The tie rod jam nut as in claim 1, and further comprising a seal for engaging between the second end of the tubular body and the tie rod.

14. A tie rod assembly, comprising:

an elongated tie rod having a first end and a second end, the first and second ends each having an axially extended threaded bore constructed and arranged to threadingly receive first and second connecting components, respectively each of the first and second end having an axially facing jam nut engaging portion;

a first jam nut for engaging one of the jam nut engaging portions, comprising an elongated tubular body having a first end and a second end, the body having an axial internal bore constructed and arranged to receive a portion of the elongated tie rod;

a locking portion connected to the tubular body, the locking portion positioned at the first end of the tubular body and having a threaded bore constructed and arranged to threadingly engage an externally threaded portion of one of die first and second connecting components threadingly engaged with the tie rod, the locking portion having an axially facing face portion constructed and arranged, upon rotation of the locking portion in a first direction about the threaded portion of the one of the first and second connecting components, to engage an opposed one of the jam nut engaging portions of the tie rod in a manner to create opposed axial forces between the locking portion and the tie rod, and in the externally threaded portion of the one of the first and second connecting components, so as to rotationally and axially lock the one of the first and second connecting components with respect to the tie rod and locking portion and, upon rotation of the locking portion in a direction opposite the first direction about the threaded portion of the one of the first and second connecting components, to disengage the same opposed jam nut engaging portion of the tie rod to release the opposed axial forces between the locking portion and the tie rod, and in the externally threaded portion of the one of the first and second connecting components, so as to rotationally and axially unlock such connecting component with respect to the tie rod and locking portion;

an engagement portion connected to the tubular body and spaced distally from the locking portion toward the second end of the tubular body, the engagement portion constructed and arranged to be engaged and rotated so as to remotely rotate the locking portion between the locked and unlocked positions.

15. The tie rod assembly as in claim 14, and further comprising:

a first connecting component for engagement with the first end threaded bore of the tie rod, the first jam nut engaging the first connecting component and the first end jam nut engaging portion;

a second connecting component for engagement with the second end threaded bore of the tie rod; and a second jam nut for engaging the second connecting component and the second end jam nut engaging portion.

16. The tie rod assembly as in claim 15, wherein at least one of the first and second connecting components is a heim joint.

17. The tie rod assembly as in claim 15, wherein at least one of the first and second connecting components is a tie rod end.

18. The tie rod assembly as in claim 14, wherein the engagement portion is positioned at the second end of the tubular body.

19. The tie rod assembly as in claim 15, wherein the engagement portion is positioned proximal the second jam nut.

20. The tie rod assembly as in claim 14, wherein the engagement portion is hexagonally shaped for engagement with a wrench.

21. The tie rod assembly as in claim 14, wherein the face portion of the locking portion lies in a plane perpendicular to an axis of the elongated tubular body.

22. The tie rod assembly as in claim 14, wherein the engagement portion is spaced away from the locking portion of the tubular body by at least 50% of a length of the tie rod.

23. The tie rod assembly as in claim 22, wherein the engagement portion is spaced away from the locking portion of the tubular body by at least 70% of the length of the tie rod.

24. The tie rod assembly as in claim 23, wherein the engagement portion is spaced away from the locking portion of the tubular body by between 70% and 95% of the length of the tie rod.

25. The tie rod assembly as in claim 14, wherein the tubular body, the locking portion and the engagement portion are assembled together as a unitary assembly.

26. The tie rod assembly as in claim 14, wherein the tubular body, the locking portion and the engagement portion are constructed in a unitary manner.

27. The tie rod assembly as in claim 14, wherein the tie rod includes a graduated scale on its exterior space and the tie rod jam nut includes markings for comparison to the graduated scale.

28. The tie rod assembly as in claim 14, wherein the tie rod jam nut includes a seal for engaging between the second end of the tubular body and the tie rod.

\* \* \* \* \*